(12) United States Patent
Monga et al.

(10) Patent No.: US 11,803,595 B1
(45) Date of Patent: Oct. 31, 2023

(54) SYSTEMS AND METHODS FOR DATA ANALYSIS

(71) Applicant: Inferencio Inc., Saratoga, CA (US)

(72) Inventors: Rajat Monga, Saratoga, CA (US); Suharsh Sivakumar, Santa Clara, CA (US); Varun Saini, Sammamish, WA (US)

(73) Assignee: INFERENCE IP, LLC, Saratoga, CA (US)

( * ) Notice: Subject to any disclaimer, the term of this patent is extended or adjusted under 35 U.S.C. 154(b) by 0 days.

(21) Appl. No.: 17/671,257

(22) Filed: Feb. 14, 2022

Related U.S. Application Data

(60) Provisional application No. 63/156,244, filed on Mar. 3, 2021.

(51) Int. Cl.
*G06F 16/906* (2019.01)
*G06F 16/904* (2019.01)

(52) U.S. Cl.
CPC .......... *G06F 16/906* (2019.01); *G06F 16/904* (2019.01)

(58) Field of Classification Search
CPC .............................. G06F 16/906; G06F 16/904
See application file for complete search history.

(56) References Cited

U.S. PATENT DOCUMENTS

| | | | |
|---|---|---|---|
| 8,099,674 B2 | 1/2012 | MacKinlay et al. | |
| 8,446,421 B2 | 5/2013 | Low et al. | |
| 9,269,095 B1 | 2/2016 | Chan et al. | |
| 9,589,299 B2 | 3/2017 | Visbal et al. | |
| 9,767,145 B2 * | 9/2017 | Prophete | G06Q 10/0639 |
| 10,127,695 B2 | 11/2018 | Garvey et al. | |
| 10,216,824 B2 | 2/2019 | Werner | |
| 10,313,466 B2 | 6/2019 | Byrnes et al. | |
| 10,985,993 B2 * | 4/2021 | George | H04L 41/142 |
| 2010/0295856 A1 | 11/2010 | Ferreira et al. | |
| 2014/0040806 A1 * | 2/2014 | Anderson | G06F 40/177 715/771 |
| 2016/0092475 A1 | 3/2016 | Stojanovic et al. | |
| 2016/0379148 A1 * | 12/2016 | Brown | G06Q 10/06316 705/7.26 |
| 2019/0251457 A1 * | 8/2019 | Byrnes | H04L 67/566 |
| 2019/0387008 A1 | 12/2019 | Visbal et al. | |
| 2020/0334238 A1 | 10/2020 | Sherman et al. | |

* cited by examiner

*Primary Examiner* — Baoquoc N To
(74) *Attorney, Agent, or Firm* — Wilson Sonsini Goodrich & Rosati

(57) ABSTRACT

The present disclosure provides systems and methods for data analysis. An example method may comprise receiving a data stream comprising a plurality of records. A record of said plurality of records may comprise a plurality of attributes. The method may further comprise classifying each of said plurality of attributes as a dimension or a measure. The method may further comprise dividing said plurality of records into a plurality of time periods. The method may further comprise, for a time period of said plurality of time periods, generating one or more segments of records. Each segment of the one or more segments may comprise records having a combination of dimensions with unique values as compared to other segments of said one or more segments. The method may further comprise applying an algorithm to said one or more segments to generate an output. The method may further comprise displaying, on a graphical user interface, a graphical representation of said output to a user.

17 Claims, 13 Drawing Sheets

SYSTEMS AND METHODS FOR DATA ANALYSIS

PRIORITY

This application claims priority to U.S. Provisional Patent Application No. 63/156,244, filed Mar. 3, 2021, which is entirely incorporated herein by reference.

BACKGROUND

As data grows in volume and dimensionality, data analysis becomes more difficult. Current methods may involve piecemeal data analysis, requiring parameters to be picked each time an analysis is performed.

SUMMARY

The present disclosure provides systems and methods for performing data analysis. A data analysis system as described herein may receive a data stream comprising a plurality of records comprising a plurality of attributes. The system may classify each of the attributes as a dimension or a measure. A dimension may be any portion of an incoming data stream that includes qualitative attributes. A measure may be any portion of an incoming data stream that includes quantitative attributes. The system may generate a summary of the measures. A summary of the measures may be, for example, a sum, a mean, a median, or a mode of the measures. A summary may also be approximated by data sketches or other similar techniques. The system may divide the records into time periods. The system may generate a summary of the measures in the records of a time period. The system may generate segments of records for each time period. The segments may be made up of different combinations of dimensions included in the individual records. The system may generate segments of records for each of the generated time periods or only for a number of the generated time periods. The segments of records may comprise every possible combination of dimensions included in the individual records. The segments of records may further comprise records having a combination of dimensions with unique values as compared to other segments. The system may generate segments of records after the system has completed a single pass of the data stream, or after the system has completed two or more passes of the data stream. The system may prune segments that contain less than a threshold quantity of records. The pruning may discard segments containing records inconsequential or unrelated to the overall data analysis. The system may apply an algorithm to the segments to generate an output. The algorithm may generate an output that correlates and draws connections between segments. The system may display a graphical representation of the output to a user via a graphical user interface.

The system described above provides several improvements to the technical field of data analysis. The system can generate the segmented data, and different types of summaries of data, in a single pass of an incoming data stream. This may allow segments to be updated incrementally when new data becomes available without requiring a full rerun over the entire data stream. The automatic division of the data stream into time periods and segments comprising combinations of dimensions may allow a user to quickly and easily determine trends and correlations of subsets of the data stream over time. In contrast, manual segmentation of data streams into segments may be labor intensive or even impossible for large sets with many dimensions. The system can also automatically prune segments that are small or otherwise inconsequential, allowing data analysis to be performed only on useful data to a user. The systems and methods also provide for the generation of graphical representations of data analysis that can visually indicate to a user the analysis performed.

In an aspect, the present disclosure provides for a method comprising: (a) receiving a data stream comprising a plurality of records, wherein a record of the plurality of records comprises a plurality of attributes; (b) classifying each of the plurality of attributes as a dimension or a measure; (c) dividing the plurality of records into a plurality of time periods; (d) for a time period of the plurality of time periods, generating one or more segments of records, wherein each segment of the one or more segments comprises records having a combination of dimensions with unique values as compared to other segments of the one or more segments; (e) applying an algorithm to the one or more segments to generate an output; and (f) displaying on a graphical user interface, a graphical representation of the output to a user. In some embodiments, the dimensions are qualitative attributes. In some embodiments, the measures are quantitative attributes. In some embodiments, the method further comprises, prior to (c), generating a summary of a measure in the plurality of records. In some embodiments, the summary comprises one or more of a sum, mean, median, and mode of the measure across the plurality of records. In some embodiments, the method further comprises, subsequent to (c), generating a summary of a measure in records in a time period of the plurality of time periods. In some embodiments, the summary comprises one or more of a sum, mean, median, and mode of the measure across the records in the time period. In some embodiments, a quantity of the plurality of time periods is bounded. In some embodiments, the one or more segments generated in (d) comprise every possible combination of dimensions. In some embodiments, the method further comprises, subsequent to (d), pruning segments that satisfy a criterion. In some embodiments, the one or more segments are generated after a single pass through the data stream. In some embodiments, the one or more segments are generated after a second pass through the data stream. In some embodiments, the output indicates whether a measure in a selected segment of the one or more segments is an outlier as compared to the measure in other segments of the one or more segments. In some embodiments, the output comprises a forecast of one or more measures in at least one segment of the one or more segments for at least one time period of the plurality of time periods. In some embodiments, the method further comprises comparing the forecast to actual values of the one or more measures in the at least one segment of the one or more segments for the at least one time period of the plurality of time periods, and identifying one or more outlier segments for each of the one or more measures based at least in part on the comparison of the forecast to the actual values. In some embodiments, the output indicates whether a first segment of the one or more segments is correlated with a second segment of the one or more segments. In some embodiments, the output ranks one or more measures in each of the one or more segments based at least in part on relevance to each of the one or more segments. In some embodiments, (d) is performed for each time period of the plurality of time periods. In some embodiments, the output indicates whether a segment in a first time period of the plurality of time periods is correlated with a corresponding segment in a second time period of the plurality of time periods.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
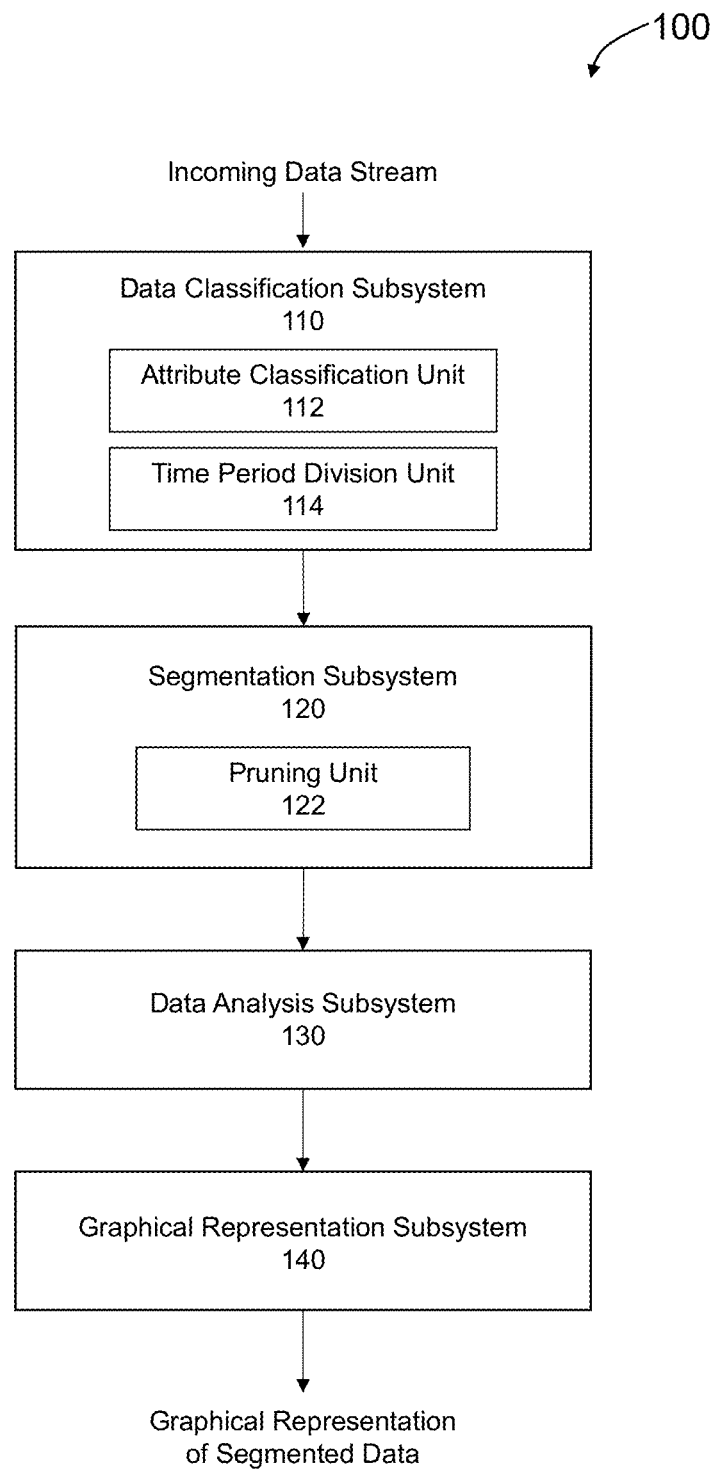
FIG. 1 schematically illustrates a system for segmenting and visualizing data.

FIG. 1 schematically illustrates a system 100 for segmenting and visualizing data to a user, according to some embodiments of the present disclosure. The system 100 may have a data classification subsystem 110, a segmentation subsystem 120, a data analysis subsystem 130, and a graphical representation subsystem 140. The system 100 can receive a data stream, classify a plurality of attributes in the data stream as dimensions or measures, and divide the data stream into time periods. The system 100 can then generate segments of records within the time periods and apply an algorithm to the segments to generate outputs. The system can display the outputs or representations of the outputs on a graphical user interface (GUI) of a computing device.

The data classification subsystem 110 may have an attribute classification unit 112 and a time period division unit 114. The data classification subsystem 110 can receive an incoming data stream. The data stream may comprise a plurality of records (e.g., data entries). The records may have one or more attributes, and the one or more attributes may be dimensions or measures. A dimension may be any portion of an incoming data stream that includes qualitative attributes. A measure may be any portion of an incoming data stream that includes quantitative attributes. The attribute classification unit 112 of the data classification subsystem 110 can classify each attribute of the records as a dimension or a measure. The time period division unit 114 can then further divide the records into a plurality of time periods.

The segmentation subsystem 120 can generate one or more segments of records in each time period. The segments may include records having a combination of the dimensions included in the time period, and each segment may have a unique combination of dimensions as compared to each of the other segments generated.

The data analysis subsystem 130 can analyze the data in each segment and generate an output. For example, the data analysis subsystem can apply one or more algorithms to the segments to generate an output. The algorithms may include, for example, streaming algorithms, or sketches, which are configured to provide results orders-of-magnitude faster and with mathematically proven error bounds. These sketches allow for faster analysis of large sizes of data. These algorithms may be applied to look for relationships that exist amongst the segments. A non-limiting example of functions the algorithms may perform are: determining whether a segment looks to be an outlier compared to other segments, finding trends that exist amongst the segments, correlating different segments or time ranges, comparing different segments over time, explaining any trends found amongst the segments, perform a cohort analysis of similar segments, and forecast future expectations based on the data in the segments.

The graphical representation subsystem 140 can generate graphical representations of the outputs generated by the data analysis subsystem 130 and display those graphical representations in a GUI.

The subsystems of FIG. 1 and their components can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the subsystems. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

Figure 2:
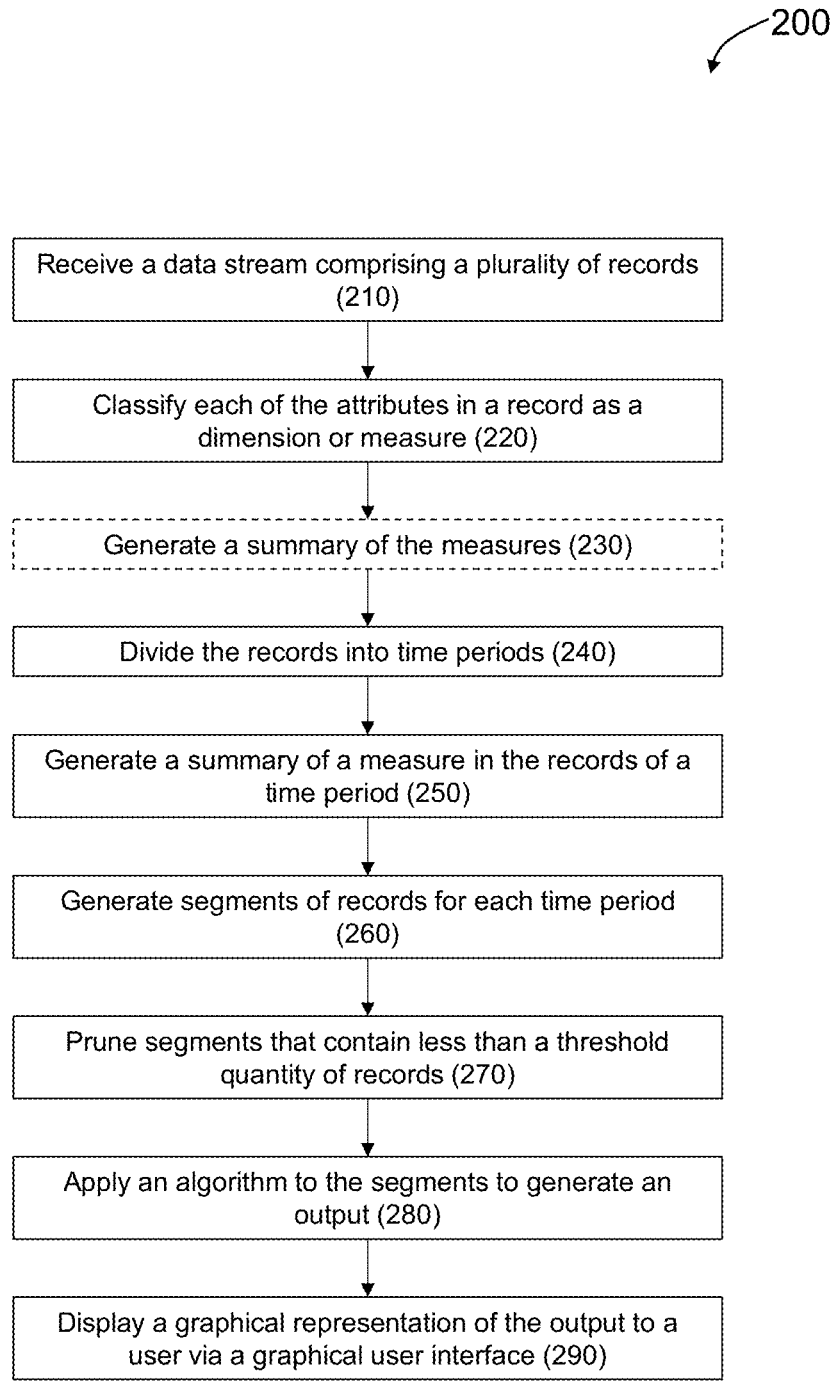
FIG. 2 is a flow chart of a process for segmenting and visualizing data.

FIG. 2 is a flow chart of a process 200 for segmenting and visualizing data to a user, according to some embodiments of the present disclosure. The process 200 can be performed by a system of one or more appropriately programmed computers in one or more locations. For example, the process can be performed by the system 100 of FIG. 1.

The system can receive a data stream comprising a plurality of records (210). The data stream may originate from a variety of sources. For example, a user of the system can generate the data stream locally. Additionally, or alternatively, the data may originate from a remote source, e.g., a database, an enterprise or extraprise system, an Internet-of-Things (IoT) device, a sensor, or the like. The records may be a collection of data entries. The records may have a plurality of attributes (e.g., data fields). In one non-limiting example, the data stream may include a plurality of records that represent individual sales made by a company. A particular record may have the following attributes: the date and time of the sale, the location or sales region of the sale, the salesperson or store responsible for the sale, the category or product line to which the sold product belongs, and the revenue generated by the sale. In another non-limiting example, the data stream may include a plurality of records that represent individual downloads of a mobile application made by a company. A particular record may have the following attributes: the date and time of the download, the device to which the mobile application was downloaded, the age of the user downloading the mobile application, the location or region where the download occurred, the category to which the mobile application belongs, and the revenue generated by the download. As an additional, non-limiting example, the data stream may include a plurality of records that represent individual services performed by a company. A particular record may have the following attributes: the date and time of the service performed, the location or region of the performed service, the type of service performed, the amount of time to perform the service, the number of employees required to perform the service, and the revenue generated by the performed service.

The system can classify each of the attributes from the data stream as a dimension or a measure (220). A dimension may be any portion of an incoming data stream that includes qualitative attributes. A measure may be any portion of an incoming data stream that includes quantitative attributes. The system may apply one or more algorithms to the incoming data stream to classify the attributes. The algorithm may be a machine learning algorithm. The machine learning algorithm may be a classifier such as a decision tree, a neural network, a K nearest neighbor algorithm, or the like. The algorithms may also include, for example, streaming algorithms, or sketches, which are configured to provide results orders-of-magnitude faster and with mathematically proven error bounds. These sketches allow for faster analysis of large sizes of data. The system may receive a data stream and classify the attributes based on the type of data of the attribute. For example, if the attribute includes a character string, the system may classify the attribute as a dimension. Alternatively, if the attribute includes a numerical value, the system may classify the attribute as a measure. Additionally, the system may also look at the variability of an attribute among a plurality of records. For example, if the attribute is always one of (1) "West Sales Region," (2) "East Sales Region," or (3) "North Sales Region," then the system may classify the attribute as a dimension. Additionally, an attribute with a small set of values that are repeated across many records may be classified as a dimension. As an additional example, the system may divide numerical values of an attribute and classify the attribute at a dimension. Alternatively, if the attribute varies, but generally includes a numerical value, the system may classify the attribute as a measure. Returning to the sales example above, the system may classify the date and time of the sale, the location or sales region of the sale, the salesperson or store responsible for the sale, and the category or product line to which the sold product belongs as dimensions. The system may classify the revenue generated by the sale as a measure.

In some cases, the system can generate a summary of the attributes that have been classified as measures (230). For example, the system can compute a sum, a mean, a median, or a mode of a measure over the entire data stream. Additionally, the system can provide a summary including a count, a distinct count, a variance, the most common values, or the most important values included in the measures. In some cases, operation 230 may be omitted and performed after subsequent operations, as will be discussed.

The system can divide the plurality of records into a plurality of time periods (240). The length of the time periods may be at least about a minute, an hour, a day, a week, a month, a quarter, a year, or more. Thus, the measures in each dimension included in the record can be divided into one or more of these time periods. The number of time periods generated can be limited by the time spanned in the data stream. The system can further bound the number of time periods generated to save on data storage and computation costs.

Figure 3:
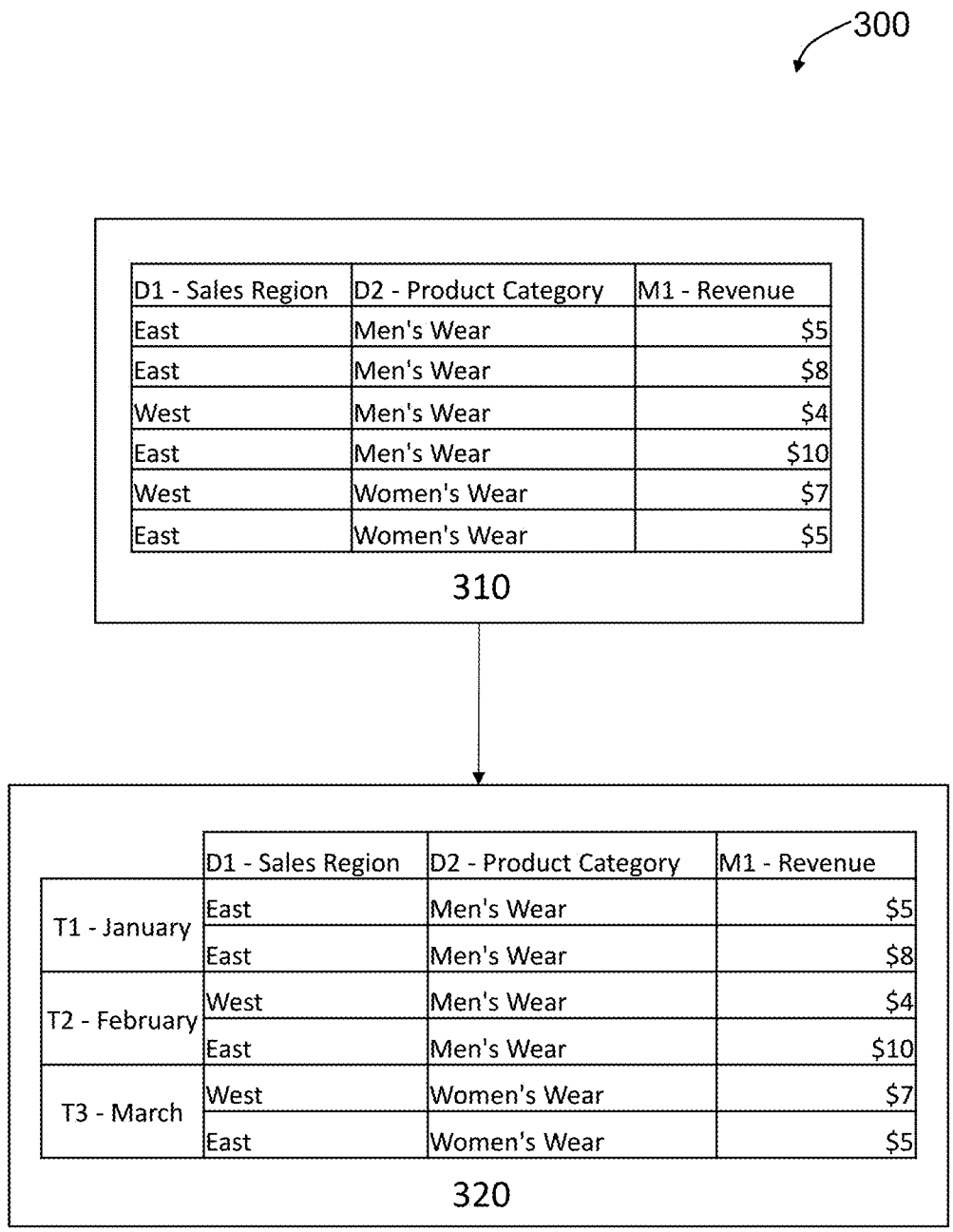
FIG. 3 illustrates a division of data records into time periods.

The operation 240 is illustrated in FIG. 3. FIG. 3 shows a data stream with six records at 310. Each record has three attributes, including two dimensions, D1 and D2, and a measure, M1. The dimension D1 is a sales region. For example, the dimension D1 may be East or West. The dimension D2 is a product category. For example, the dimension D2 may be Men's Wear or Women's Wear. The measure M1 is the amount of revenue generate by a sale. For example, the measure M1 may be $5 or $10. The system can divide the data records into a plurality of time periods (T1, T2, and T3) as shown at 320. Thus, the measures for each dimension in the records can be divided into separate and distinct time periods. The time periods (T1, T2, and T3) are January, February, and March, as illustrated in FIG. 3.

Returning to FIG. 2, the system can generate a summary of a measure across the records of a time period (250). Alternatively, or additionally, the system can generate a summary of the measure across all time periods, or a subset of all time periods. The system can generate a sum, a mean, a median, or a mode for the amounts of revenue generated for each of January, February, and March. The system can also generate a summary for the amounts of revenue generated for January through March, January through February, or February through March. For example, as illustrated in FIG. 3, a sum generated for revenue in the "East" sales region in January is $13, a sum generated for revenue in the "East" sales region in February is $10, and a sum generated for revenue in the "East" sales region in March is $5. Further, a sum generated for revenue in the "East" sales region for January through March is $28. A sum generated for revenue in the "East" sales region for January through February is $23. And a sum generated for revenue in the "East" sales region for February through March is $15.

The system can generate segments of records included in each time period (260). The segments may be made up of different combinations of dimensions included in the individual records. The system can generate segments of records for each time period generated at operation 240, or for a number of time periods generated at operation 240. Together, the segments may comprise records with every possible combination of dimension values. Each segment may comprise records with a unique combination of dimension values as compared to other segments. The system can generate segments of records after the system has completed a single pass of the data stream, or the system can generate segments of records after the system has completed two or more passes of the data stream.

Figure 4:
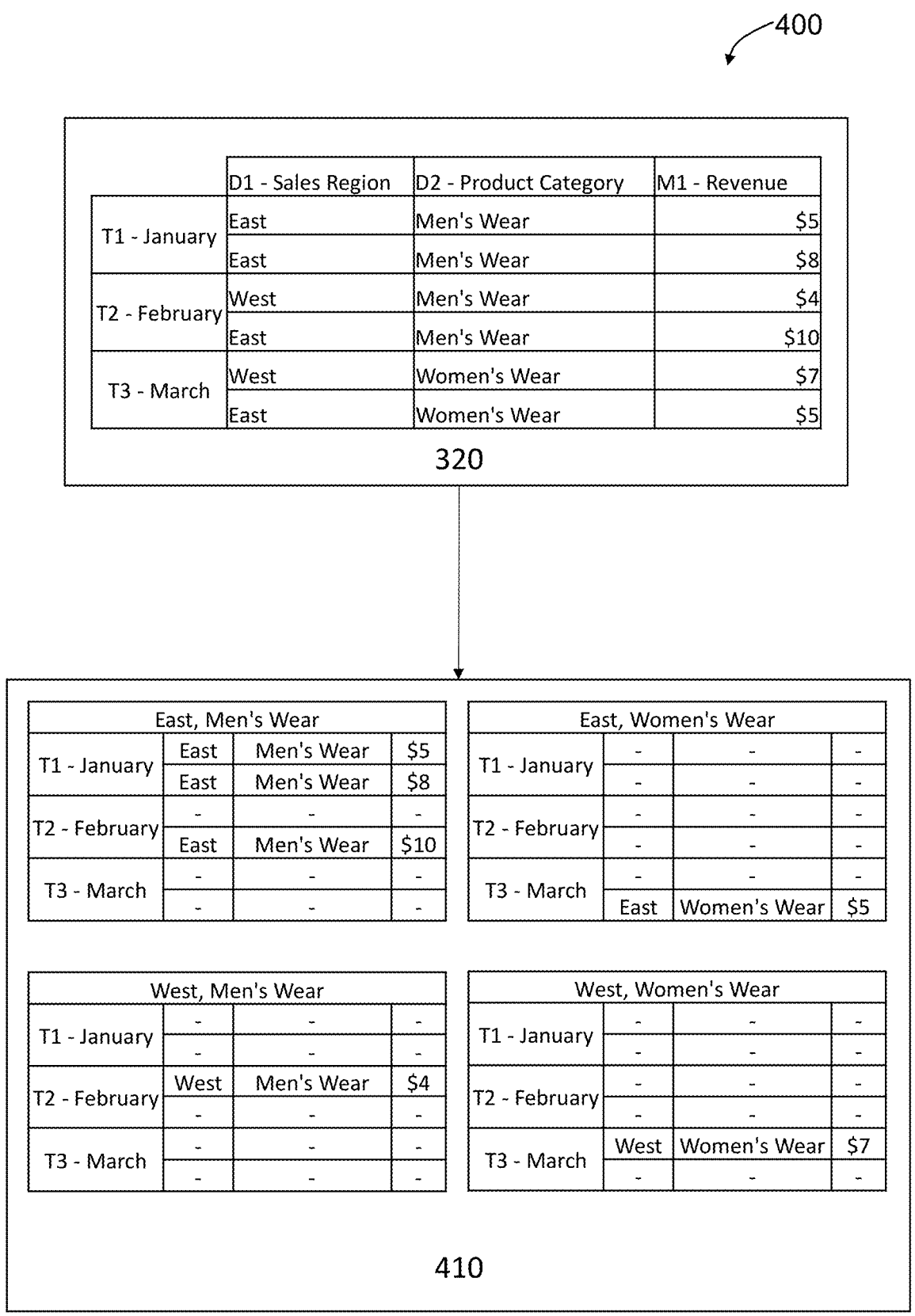
FIG. 4 illustrates a division of data records into segments.

The operation 260 is illustrated in FIG. 4. The segmentation may begin with records of data that have been divided into a plurality of time periods, as illustrated in FIG. 3 at 320. The system can divide the records into a plurality of segments at 410 including combinations of dimensions for each of the time periods from 320. As illustrated at 410, the system can generate a segment for every possible combination of dimensions ("East, Men's Wear," "East, Women's Wear," "West, Men's Wear," and "West, Women's Wear") for each of the time periods generated at 320 (January, February, and March). For example, the system can generate a segment for the "East, Men's Wear" combination of dimensions for each of the January, February, and March time periods. The system can generate a segment for the "East, Women's Wear" combination of dimensions for each of the January, February, and March time periods. The system can generate a segment for the "West, Men's Wear" combination of dimensions for each of the January, February, and March time periods. And, the system can generate a segment for the "West, Women's Wear" combination of dimensions for each of the January, February, and March time periods.

The system may generate a summary of a measure included in the generated segments. For example, a sum of revenue in the "East, Men's Wear" segment for the January time period is $13 whereas a sum of revenue in the "East, Men's Wear" segment for the March time period is $0.

Returning to FIG. 2 at operation 260, the number of segments created for a complex data stream can grow rapidly with the number of dimensions and number of measures in each dimension included in the data stream. The number of segments generated can be fixed or bounded to save on data storage and computation costs.

The system can prune the number of segments generated by discarding segments containing less than a threshold quantity of records (270) to further save on data storage and computation costs. The system can prune segments containing a quantity of records outside the top X % of quantity of records contained in other segments. For example, the system can prune segments containing a quantity of records outside the top 10%, 20%, 30%, 40%, 50%, 60%, 70%, 80%, or 90% of quantity of records contained in other segments. The system can fix the number of segments to the top N number of segments containing the most records. For example, the system can fix the number of segments to the top 5, 10, 20, 30, 40, 50, 60, 70, 80, 90, 100, 200, 300, 400, 500, 600, 700, 800, 900, or 1000 segments containing the highest quantity of records. The system can also prune segments based on the numerical value of the measures included in the segment. For example, if a user of the system would like to find a part of their business that had the highest contribution to total revenue generation, then the system can take out segments including dimensions having low, or zero, amounts of revenue generation. For example, in FIG. 4, the system may take out the segments generated for "East, Women's Wear" for both January and February as no revenue was generated during those time periods. On the other hand, the system may keep the segments generated for "East, Men's Wear" for both January and February as revenue was generated during those time periods.

The system can apply an algorithm to the generated segments to generate an output (280). The outputs can allow the system to: determine whether a segment looks to be an outlier compared to other segments, find trends that exist amongst the segments, correlate different segments or time ranges, compare different segments over time, explain any trends found amongst the segments, perform a cohort analysis of similar segments, and forecast future expectations based on the data in the segments. For example, an output may indicate whether a segment in a first time period is correlated with a corresponding segment in a second time period. Going back to the example of FIG. 4 that includes the "East, Men's Wear," "East, Women's Wear," "West, Men's Wear," and "West, Women's Wear" segments, the algorithms can generate an output to help indicate to a user important correlations between these measures and dimensions. As an example, the algorithm can rank one or more measures in each of the one or more segments based at least in part on relevance to the one or more segments. Depending on the segment, the most relevant measures may be identified (e.g., ranked), for example, as those providing the biggest contribution to: increased or decreased sales, increased or decreased revenue, or increased or decreased website traffic. Going back to FIG. 4, the algorithm may identify the measures in "T1-January" for "East, Men's Wear" as more relevant than the measures in "T3-March" for "East, Men's Wear," because in "T1-January," a bigger contribution to revenue generation was made. A user may identify what type of measures may be relevant for each segment, and the algorithm can perform the ranking based on the user input. The algorithm may also perform the ranking without receiving any user input. When measures have known relationships (e.g., in case of funnels), that knowledge may be used to provide better correlations and to identify the most relevant measure for each segment. In addition, these relationships (e.g., a priori or learnt) may also be used to understand and explain measures, and refine what segments and measures are outliers. As an example, in the case of a funnel (e.g., visitors to a website), if there are more visitors to a website for a particular segment, getting more purchases in that segment may not be significant, even though that's a bigger change than a different segment that did not get more visitors. In this case, the algorithm may identify not getting more visitors in one segment as more relevant than the increase in purchases in the other segment. As an alternative, a user may have identified visitor traffic as more relevant than sales for the given segments.

The algorithm at operation 280 may find outlier segments with measures indicating poor revenue generation. For example, the company may have expected a higher amount of total revenue than was actually generated for the February time period. The algorithm at operation 280 could recognize that the "East, Women's Wear" and "West, Women's Wear" segments did not account for any revenue in the February time period, and thus generate an output for use at operation 290 that shows a user that these segments performed poorly during the February time period. As an additional example, the algorithm at operation 280 may identify a trend among the segments. For example, the algorithm at operation 280 may recognize that the "East, Men's Wear" segment generated revenue from: (1) two sales in the January time period, (2) one sale in the February time period, and (3) no sales in the March time period. The algorithm may generate an output for use at operation 290 that shows that this segment is trending in a direction of lower revenue generation for the future. As an additional example, the algorithm at operation 280 may forecast how one or more measures in each of the generated segments may perform (e.g., expected performance) for at least one time period of the plurality of time periods. The algorithm may forecast 1 day, 2 days, 3 days, 4 days, 5 days, 6 days, 1 week, 2 weeks, 3 weeks, one month, two months, three months, four months, five months, six months, seven months, eight months, nine months, ten months, eleven months, 1 year, 2 years, 3 years, 4 years, or 5 years or more into the future. The forecasted values for the time period may then be compared to actual values for the time period to identify additional outlier segments. For example, the outlier segments may not have performed as well as forecasted, may have performed better than expected, or may have provided a large contribution to observed actual values (e.g., increased or decreased sales, increased or decreased revenue, or increased or decreased website traffic).

The system can display a graphical representation of the output generated at operation 280 to a user on a GUI of a computing device (290). Graphical representations can include indicators, line charts, column charts, bar charts, pie charts, area charts, pivot tables, scatter charts, area maps, a table of contents, tree maps, or the like. For example, as mentioned in the discussion for operation 280, the algorithm may generate an output indicating that the sales revenue from the "East, Men's Wear" segment is trending in a downward direction for the future. The visual representation displayed at operation 290 may include a bar chart depicting to a user that the "East, Men's Wear" segment has consecutively generated less revenue over each time period. The bar chart can include a bar for each of the January, February, and March time periods, and the height of the bar from January to February to March may consecutively decrease to indicate that the revenue has decreased over these time periods. Additionally, the display may also include the numerical value of revenue generated for each of the January, February, and March time periods to visually depict to a user the precise amount of revenue generated in each time period.

Figure 5:
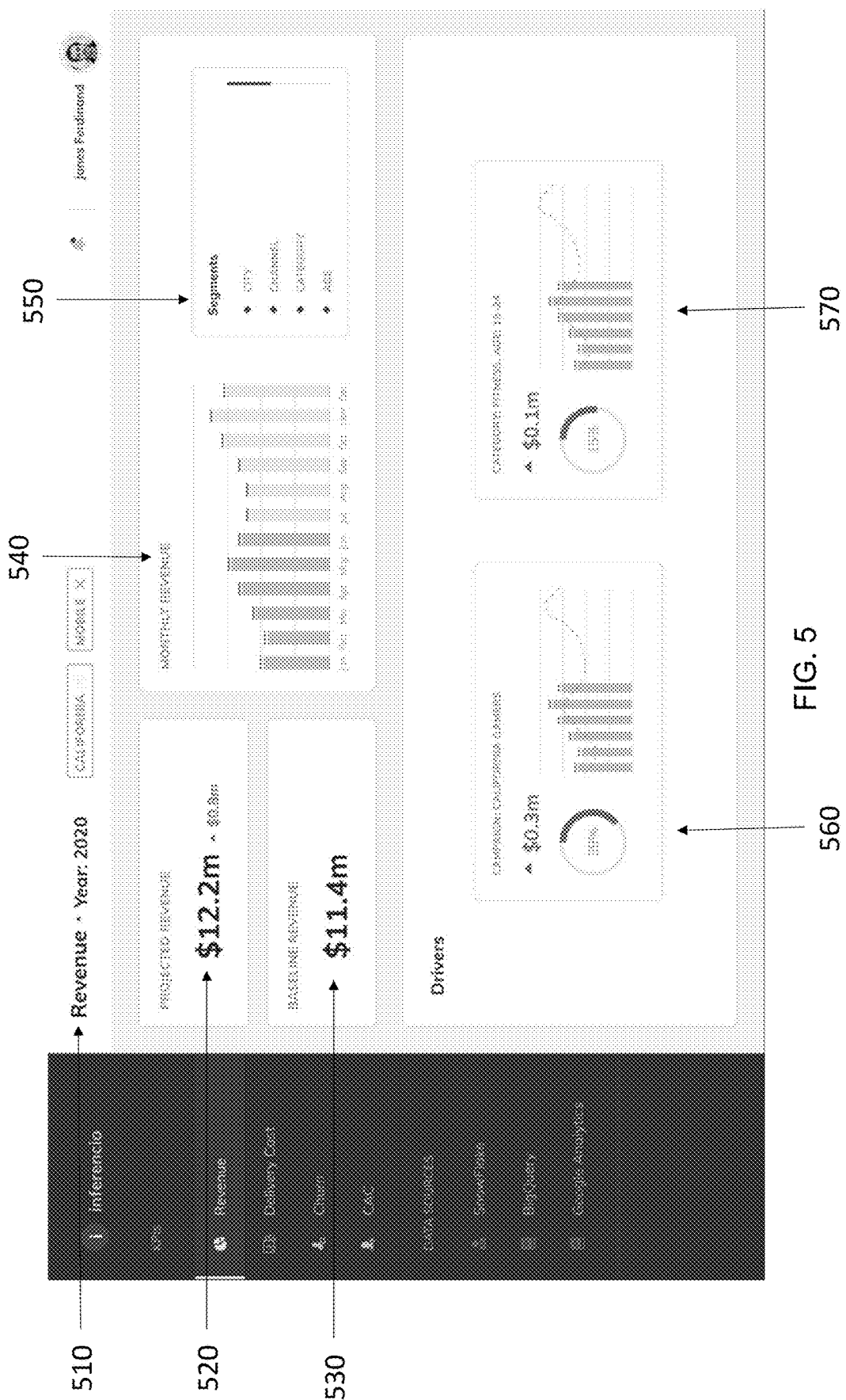
FIGS. 5-9 are examples of graphical representations generated by the system of FIG. 1.

FIGS. 5-9 illustrate non-limiting examples of graphical representations that can be generated by the systems and methods described herein. As illustrated in FIG. 5 at 510, the graphical representations show the revenue generated during the year 2020. The graphical representations include a projected revenue value 520 and a baseline revenue value 530 for the year 2020. The graphical representations include a graphical representation at 550 that shows the segments generated by the system, as described at operation 260 of FIG. 2. The graphical representations include several bar charts at 540, 560, and 570 that show revenue generation to a user. For example, graphical representations may have been generated after the end of the month of June in the year 2020. The opaque bars of the bar chart at 540 show the revenue generated across the months of January through June. Each of the months are a time period generated by the system, as described at operation 240 of FIG. 2, and the bar for each month shows a sum of revenue generated for that month/time period, as described at operation 250 of FIG. 2. The remaining transparent bars of the bar chart 540 show the projected revenue generation for the remaining months of the year. The graphical representations generated at 560 and 570 show specific areas that are drivers, or large contributors, to revenue generation. The graphical representation at 560 shows a segment generated by the system including the "Campaign: California Garners" dimension. The system can generate this segment as described at operation 260 of FIG. 2. The dotted line in the bar graph shows a forecast or prediction of the revenue this segment would generate during the year 2020. The system can generate this dotted line as a result of an output generated by an algorithm applied to a data stream designed to forecast revenue generation, as described at operation 280 of FIG. 2. The bar chart shows the actual revenue generated under this segment for the first six months of the year, which shows that this segment performed better than forecasted for each of the first six months of the year. The visual at 570, similar to the visual at 560, shows the revenue generated by a segment including the combination of the "Category: Fitness" and "Age: 18-24" dimensions. The bar chart shows that revenue generated from this segment also performed better than predicted for the first six months of the year.

Figure 6:
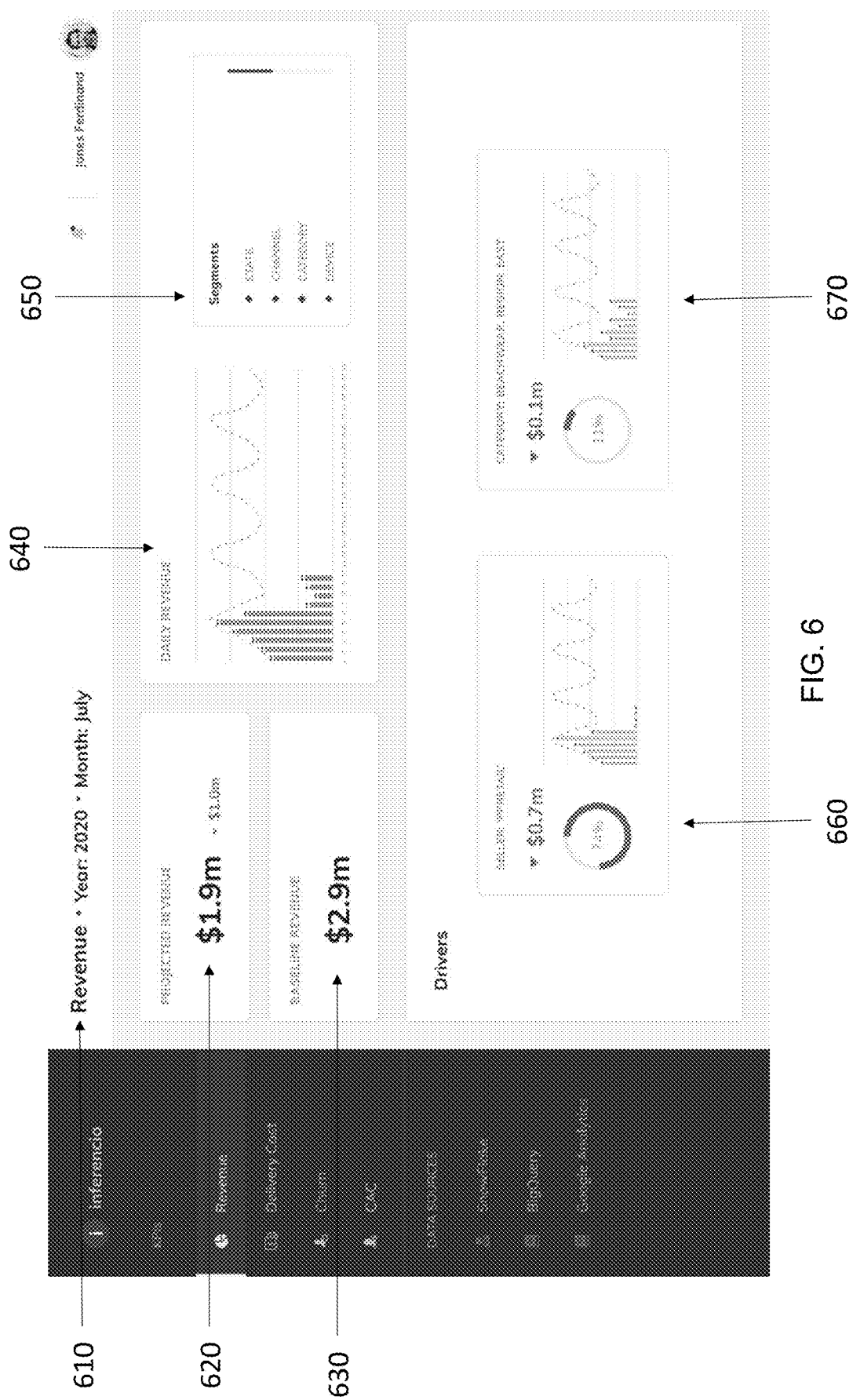

As illustrated in FIG. 6 at 610, the graphical representations show the revenue generated for the month of July in the year 2020. The graphical representations include a projected revenue value 620 and a baseline revenue value 630 for the month of July. The graphical representations include a graphical representation at 650 that shows the segments generated by the system. The graphical representations include several bar charts at 640, 660, and 670 that show revenue generation to a user. For example, graphical representations may have been generated after the end of the first ten days of the month of July. The bar chart at 640 shows a sum of the revenue generated for each of these first ten days. The dotted line shows a forecasted amount of revenue that would be generated in the month of July. The bar chart at 640 shows that revenue generation is lower than expected so far in the month of July. The graphical representations generated at 660 and 670 show specific areas that are drivers, or large contributors, to the lack of revenue generation. The graphical representation at 660 shows a segment generated by the system including the "Seller: Pretail" dimension. The dotted line in the bar graph shows a forecast or prediction of the revenue this segment would generate during the month of July. The bar chart shows that this segment is not performing as expected. The graphical representation also includes numerical values indicating to a user exactly how much this segment is underperforming (e.g., down $0.7 m). Similarly, at 670, the graphical representation shows that the segment containing the "Category: Beachwear" and "Region: East" combination of dimensions is also not performing well and is a cause for the low amounts of revenue generated.

Figure 7:
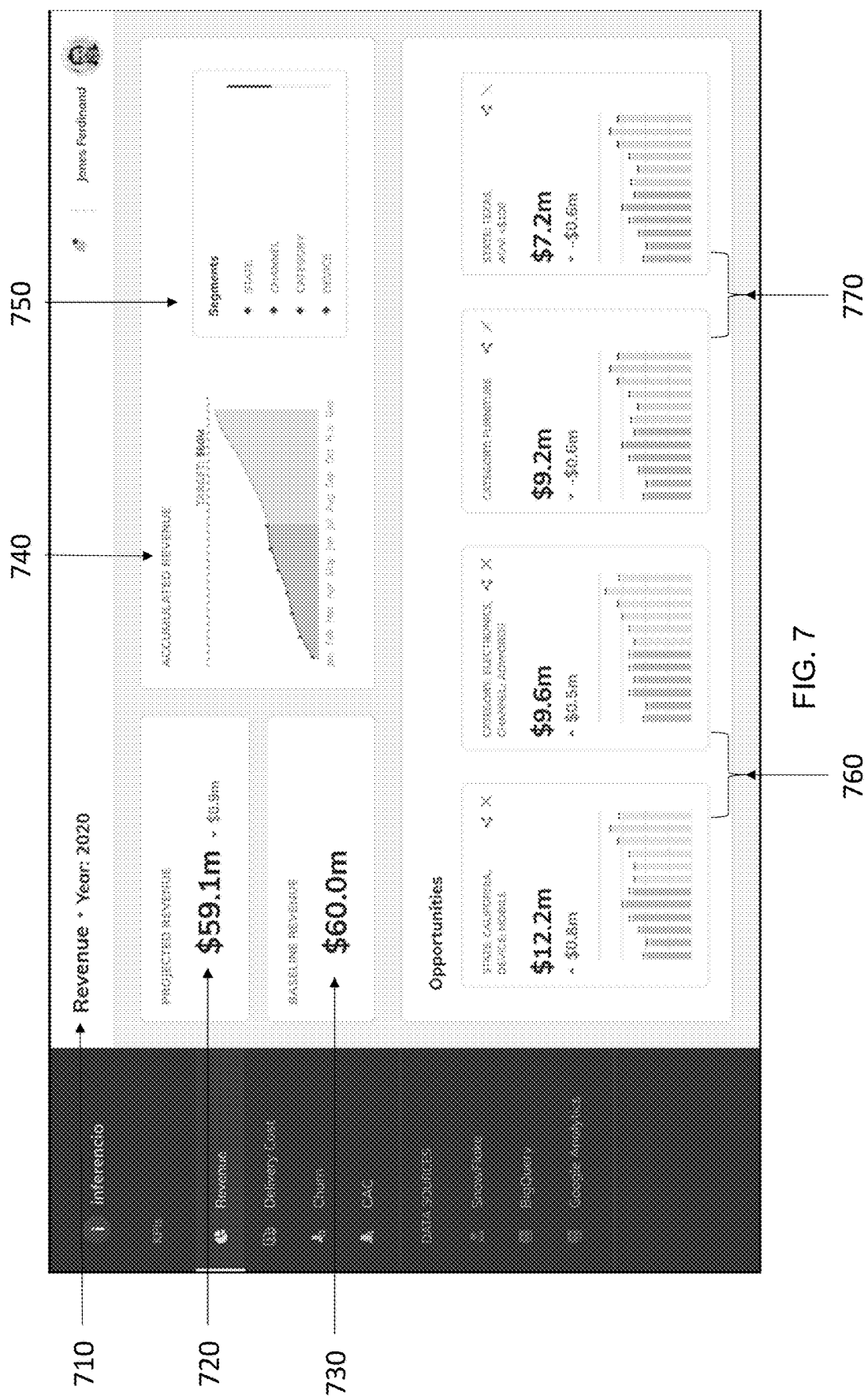

FIG. 7 illustrates graphical representations similar to those in FIGS. 5 and 6. For example, the graphical representation at 740 includes a line chart. The graphical representation at 740 may have been generated after the end of the month of July in the year 2020. The opaque section of the line chart shows the revenue generated for the months of January through July in the year 2020. The transparent section and dotted line show a forecast of revenue generation for the remaining months in the year based on the performance of the preceding seven months. The line chart 740 also includes an additional dotted line indicating the target revenue for the year of 2020. The line chart shows that the company is forecasted to arrive just short of the target revenue for 2020. The graphical representations at 760 show segments where the revenue generation is performing better than expected. On the other hand, the graphical representations at 770 show segments that are performing worse than expected. This information may be valuable to a company as a company seeks to find areas in which the company can improve and areas in which the company is already performing well.

Figure 8:
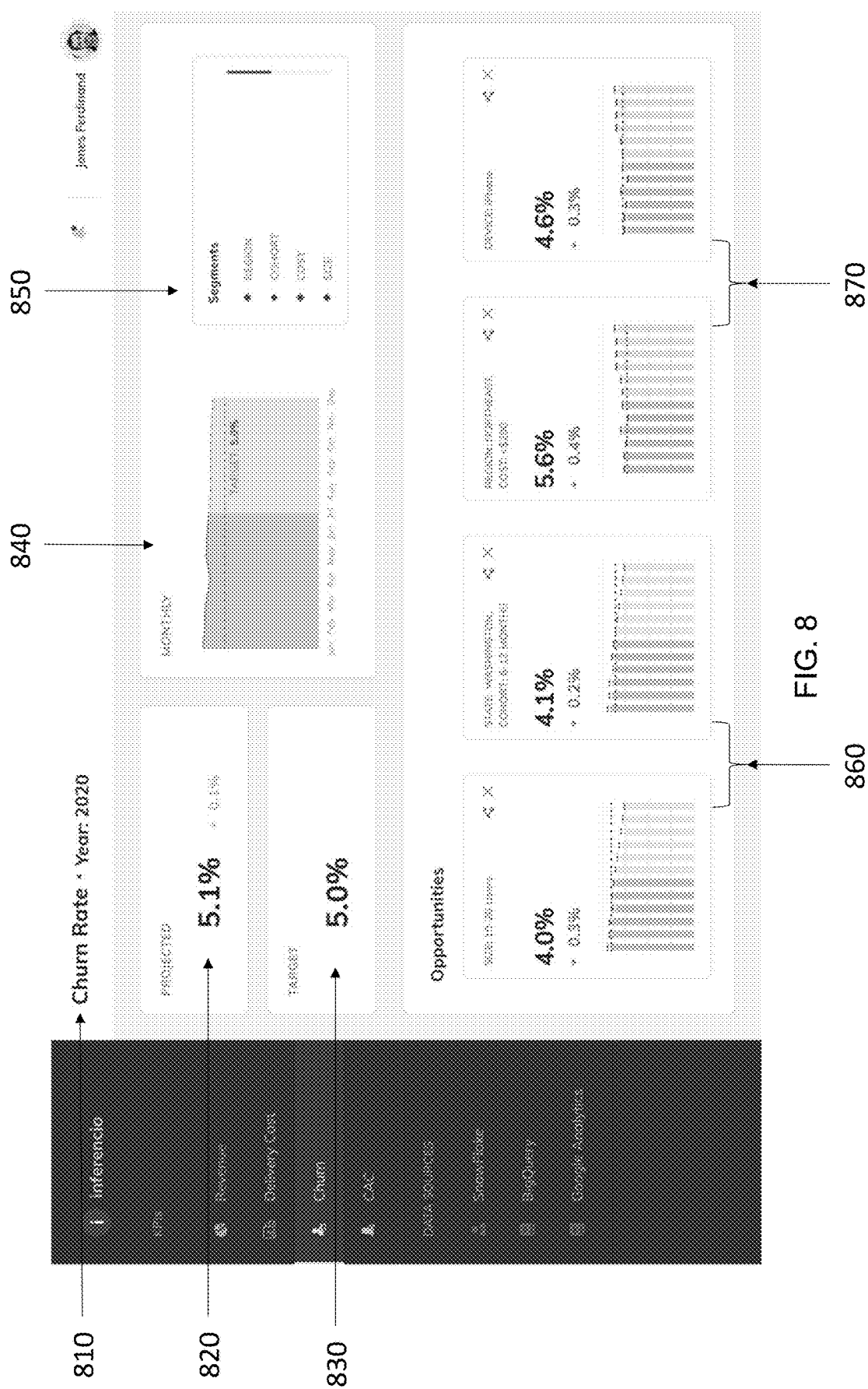

As illustrated in FIG. 8 at 810, the graphical representations show a user the churn rate a company experiences through the year 2020. The graphical representations include a projected churn rate value 820 and a target churn rate value 830 for the year of 2020. The graphical representations include a graphical representation at 850 that shows the segments generated by the system. The graphical representation at 840 includes a line chart. The graphical representation at 840 may have been generated after the end of the month of July in the year 2020. The opaque section of the line chart shows the churn rate experienced for the months of January through July in the year 2020. The transparent section and dotted line show a forecast of the churn rate for the remaining months in the year based on the performance of the preceding seven months. The graphical representation at 840 also includes a dotted line visualizing the target churn rate. The graphical representation at 840 shows that the company is experiencing a higher churn rate than was targeted for the year of 2020. The graphical representations at 860 show segments to a user where the churn rate is lower than targeted. For example, the churn rate for the segment including the dimension "Size: 10-20 Users" is experiencing a churn rate that is down 0.3% from the target churn rate. On the other hand, the graphical representations at 870 show segments to a user that have higher churn rates than expected. For example, the churn rate for the segments including the dimension "Device: iPhone" is experiencing a churn rate that is up 0.3% from the targeted churn rate.

Figure 9:
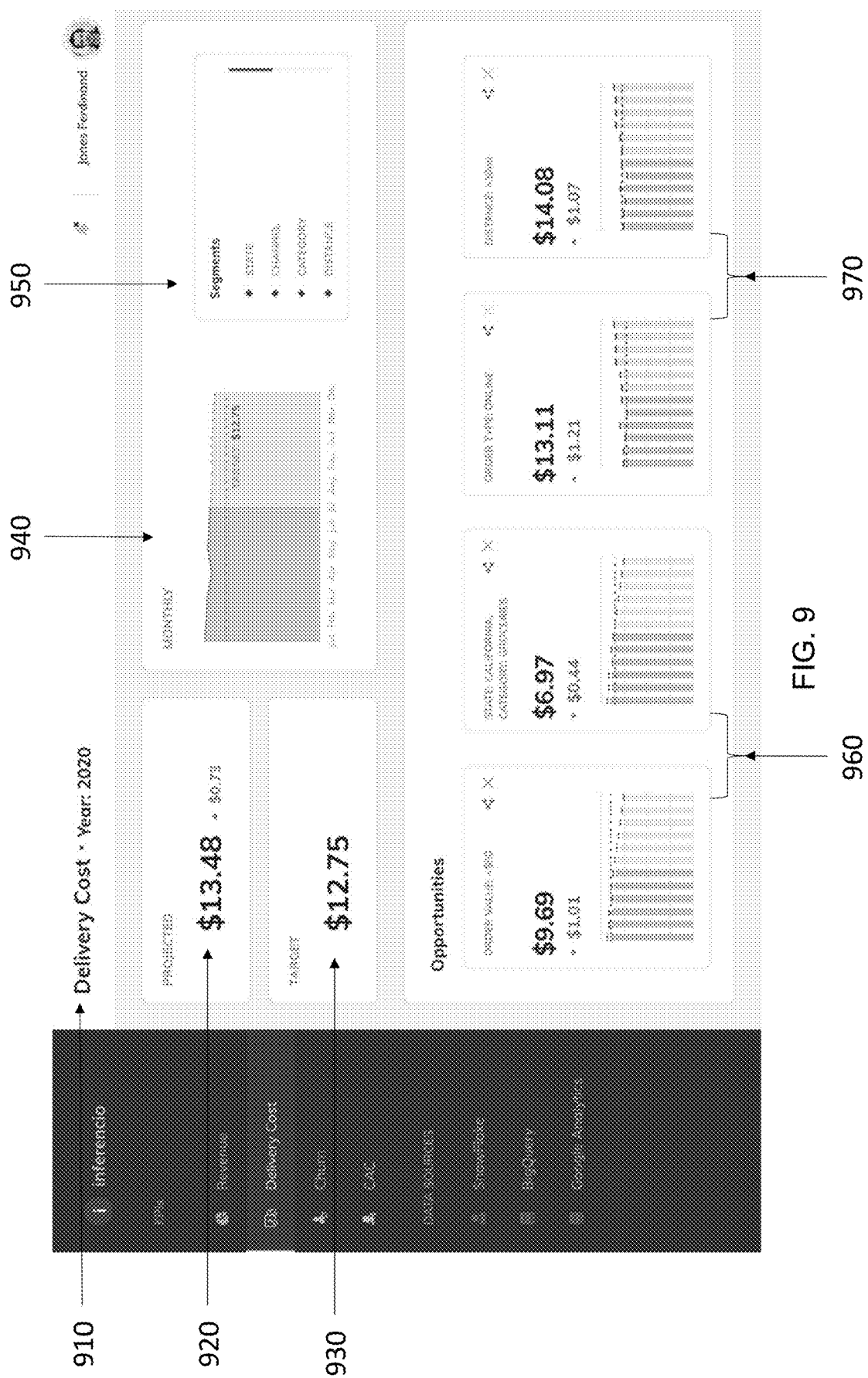

As illustrated in FIG. 9 at 910, the graphical representations show the average delivery cost a company incurs when sending an item to a customer through the year 2020. The graphical representations include a projected average delivery cost value at 920 and a target average delivery cost value at 930 for the year of 2020. The graphical representations include a graphical representation at 950 that shows a user the segments generated by the system. The graphical representation at 940 includes a line chart. The graphical representation at 940 may have been generated after the end of the month of July in the year 2020. The opaque section of the line chart shows the average delivery costs incurred for the months of January through July in the year 2020. The transparent section and dotted line show a forecast of the average delivery costs for the remaining months in the year based on the performance of the preceding seven months. The graphical representation at 940 also includes a dotted line visualizing the target average delivery cost for the year. The graphical representation at 940 shows that the company is incurring higher average delivery costs than targeted for the year of 2020. The graphical representations at 960 show segments where the average delivery costs are lower than expected. On the other hand, the graphical representations at 970 show segments where average delivery costs are higher than expected.

Figure 11:
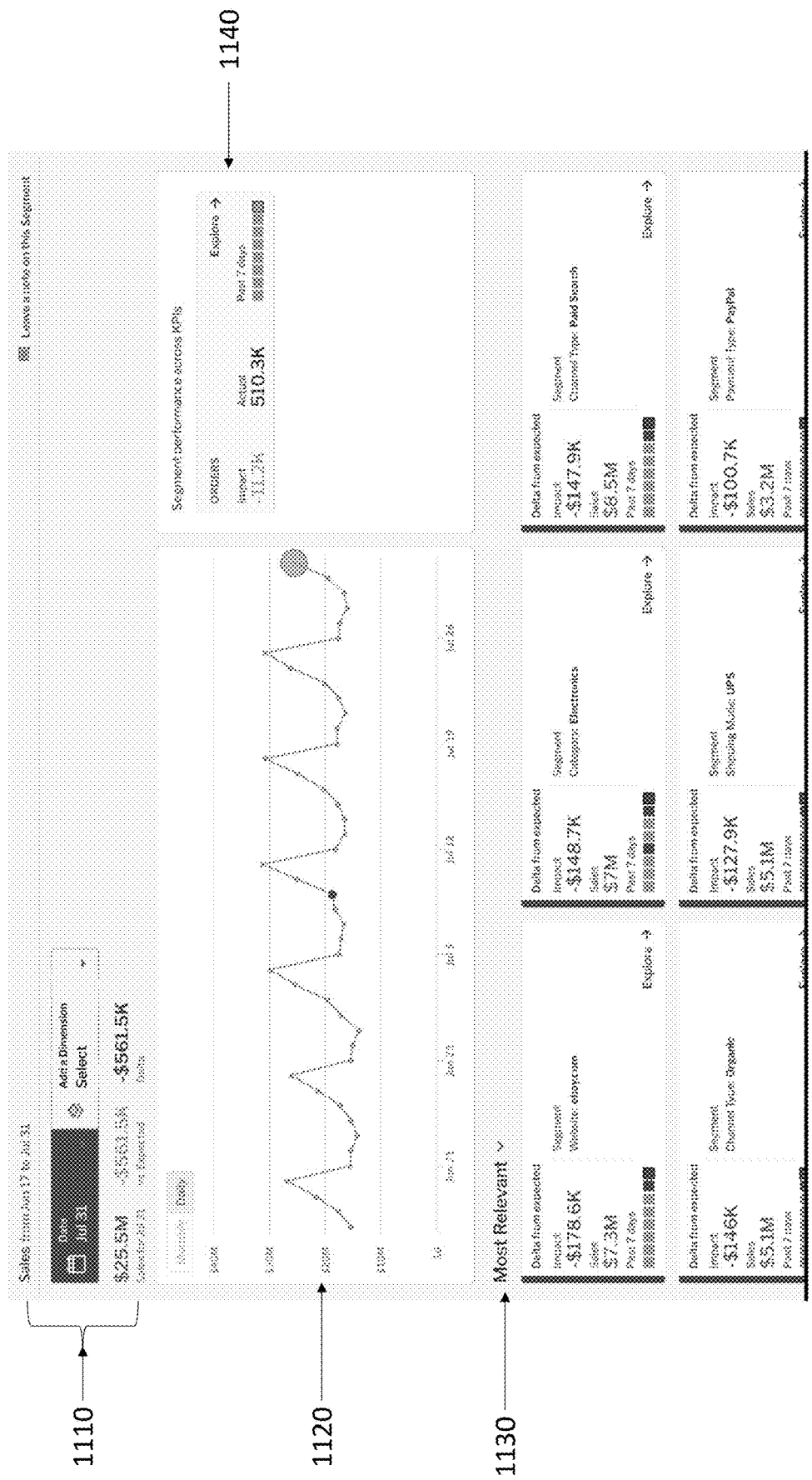
FIGS. 11-13 are examples of graphical representations generated by the system of FIG. 1.
Figure 12:
Figure 13:
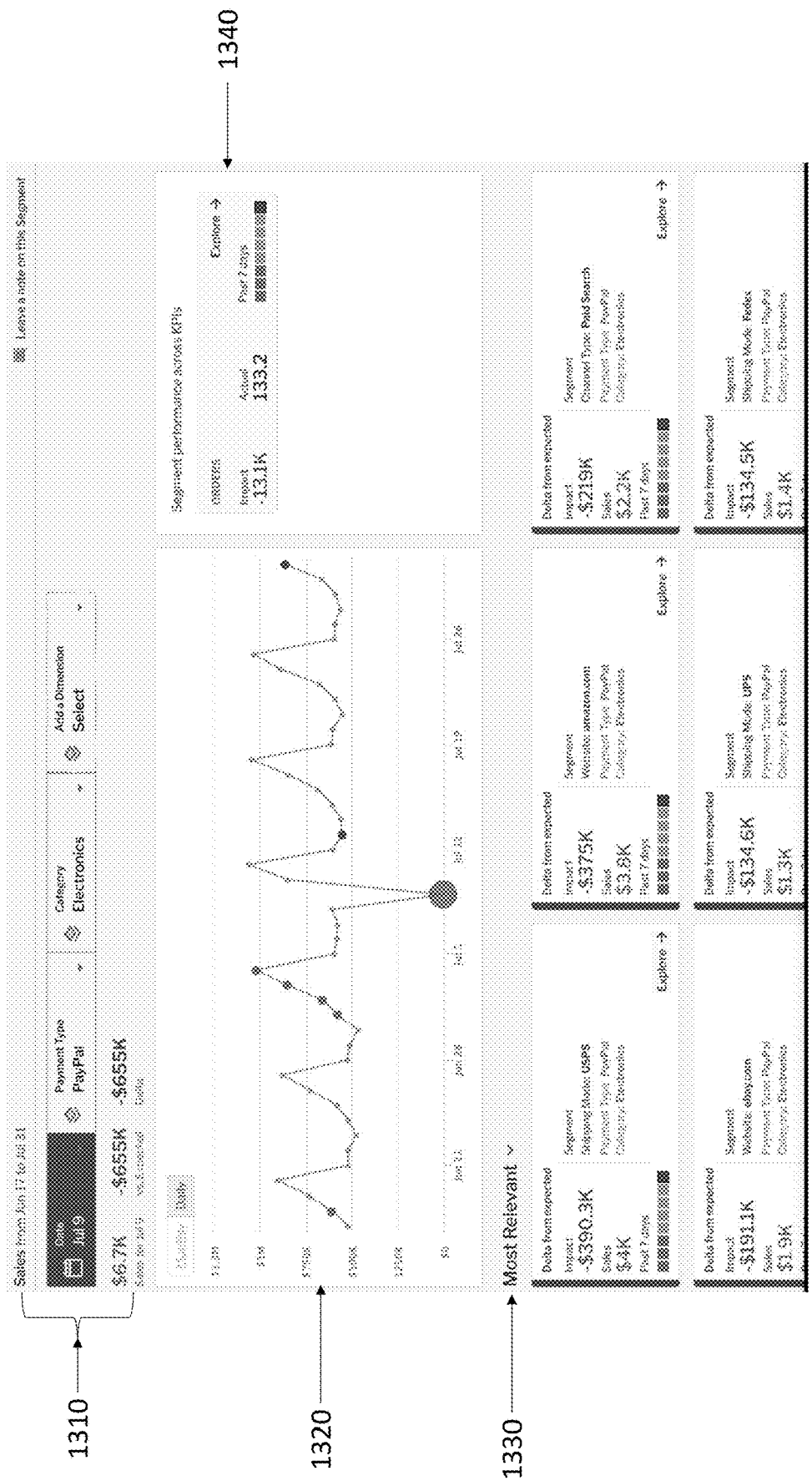

FIGS. 11-13 illustrate further non-limiting examples of graphical representations that can be generated by the systems and methods described herein. As illustrated in FIG. 11 at 1110, the system can generate graphical representations showing sales numbers from the time period spanning June 17 to July 31. This is a time period generated by the system, as described at operation 240 of FIG. 2. A user also has the ability at 1110 to select a menu for choosing additional dimensions to be included in the graphical representations. Further, at 1110, the graphical representations can show the measures of actual sales numbers, expected sales numbers, and a difference between actual and expected sales numbers for the June 17 to July 31 time period. As shown at 1110, FIG. 11 shows the sales numbers for July 31. These measures are generated as described above at operation 280 of FIG. 2. The graphical representations also include a line chart at 1120 that show daily sales revenue for each day spanning the June 17 to July 31 time period. Each dot in the line shows a sum of revenue generated for that day, as described at operation 250 of FIG. 2. As shown at 1120, the transparent circle on the line chart indicates data is being shown for July 31. The system can generate this line as a result of an output generated by an algorithm applied to a data stream designed to visualize revenue generation, as described at operation 280 of FIG. 2. The system can generate graphical representations at 1130 that show specific areas that are drivers, or large contributors, to the results shown at 1110 and 1120. For example, at 1110, a user sees that actual revenue generation for July 31 is $561.5 thousand lower than expected/forecasted. At 1130, the system can visualize the specific segments that contributed the most to the loss in expected revenue. These segments were generated as described at operation 260 of FIG. 2. The segments may be considered outliers compared to the performance of other dimensions. These segments were identified as outliers as described above at operation 280 of FIG. 2. As an example, the first box at 1130 shows that sales from the segment containing the website "ebay.com" as a dimension has sales amounting to $178.6 thousand lower than expected. The boxes also have an explore option, which allows a user to get more information for a specific segment. The system can also generate graphical representations further showing segment performance at 1140. As shown at 1140, the segment chosen is "orders," and the graphical representation can show performance in "orders" for the last 7 days, which is a time period generated as described at operation 240 of FIG. 2.

FIG. 12 illustrates the sales information of FIG. 11, but this time for the day of July 9, as indicated at 1210 and the transparent circle at 1220. As illustrated in FIG. 12 at 1210, the system can generate graphical representations showing sales numbers for July 9. This is a time period generated by the system, as described at operation 240 of FIG. 2. Further, at 1210, the graphical representations can show the measures of actual sales numbers, expected sales numbers, and a difference between actual and expected sales numbers for July 9. These measures are generated as described above at operation 280 of FIG. 2. The graphical representations also include a line chart at 1220 that show daily sales revenue for each day spanning the June 17 to July 31 time period. Each dot in the line shows a sum of revenue generated for that day, as described at operation 250 of FIG. 2. As shown at 1220, the transparent circle on the line chart indicates data is being shown for July 9. The system can generate this line as a result of an output generated by an algorithm applied to a data stream designed to visualize revenue generation, as described at operation 280 of FIG. 2. The system can generate graphical representations at 1230 that show specific areas that are drivers, or large contributors, to the results shown at 1210 and 1220. For example, at 1210, a user sees that actual revenue generation for July 9 is $985.5 thousand lower than expected/forecasted. At 1230, the system can visualize the specific segments that contributed the most to the loss in expected revenue. The segments may be considered outliers compared to the performance of other segments. These segments were generated as described at operation 260 of FIG. 2. These segments were identified as outliers as described above at operation 280 of FIG. 2. The segments may include a combination of dimensions, as described and shown at FIG. 4. For example, the box at 1230 shows that the segment containing the "Electronics" and "PayPal" dimensions has sales amounting to $655 thousand lower than expected. The boxes also have an explore option, which allows a user to get more information for a specific segment. The system can also generate graphical representations showing additional segment performance at 1240. As shown at 1240, the segment chosen is "orders," and the graphical representation can show performance in "orders" for the last 7 days, which is a time period generated as described at operation 240 of FIG. 2.

FIG. 13 illustrates the information a user would see when further exploring the segment having the "Electronics" and "PayPal" dimensions for the day of July 9. A user may select the explore option at 1230 of FIG. 12, or may use the menu at 1310 to select the "Electronics" and "PayPal" dimensions, to arrive at FIG. 13. As illustrated in FIG. 13 at 1310, the system can generate graphical representations showing sales numbers for July 9. This is a time period generated by the system, as described at operation 240 of FIG. 2. The graphical representations at 1310 also indicate that the information is being displayed for the combination of "Electronics" and "PayPal" dimensions. This combination of dimensions is generated as described and shown at FIG. 4. Further, at 1310, the graphical representations can show the measures of actual sales numbers, expected sales numbers, and a difference between actual and expected sales numbers for July 9. These measures are generated as described above at operation 280 of FIG. 2. The graphical representations also include a line chart at 1320 that show daily sales revenue for each day spanning the June 17 to July 31 time period. Each dot in the line shows a sum of revenue generated for that day, as described at operation 250 of FIG. 2. As shown at 1320, the transparent circle on the line chart indicates data is being shown for July 9. The system can generate this line as a result of an output generated by an algorithm applied to a data stream designed to visualize revenue generation, as described at operation 280 of FIG. 2. The system can generate graphical representations at 1330 that show specific areas that are drivers, or large contributors, to the results shown at 1310 and 1320. For example, at 1310, a user sees that actual revenue generation for July 9 for the "Electronics" and "PayPal" combination is $655 thousand lower than expected/forecasted. At 1330, the system can visualize the specific segments that contributed the most to the loss in expected revenue. The segments may be considered outliers compared to the performance of other segments. These segments were generated as described at operation 260 of FIG. 2. These segments were identified as outliers as described above at operation 280 of FIG. 2. For example, the first box at 1330 shows that the segment containing the "USPS" dimension, in combination with the "Electronics" and "PayPal" dimensions, has sales amounting to $390.3 thousand lower than expected. The boxes also have an explore option, which allows a user to get more information for a specific segment. The system can also generate graphical representations showing additional segment performance at 1340. As shown at 1340, the segment chosen is "orders," and the graphical representation can show performance in "orders" for the last 7 days, which is a time period generated as described at operation 240 of FIG. 2.

Computer Systems

Figure 10:
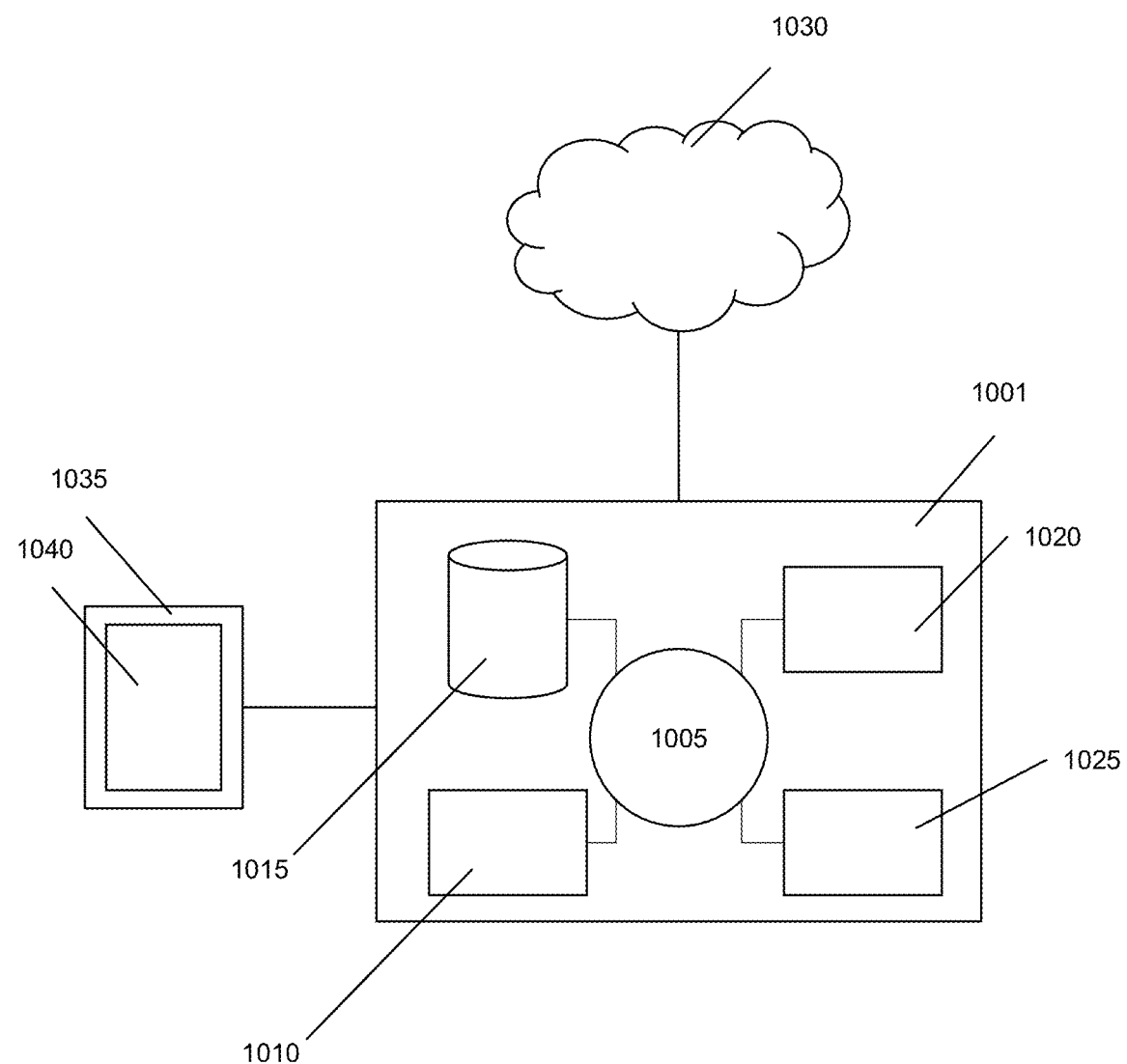
FIG. 10 shows a computer system that is programmed or otherwise configured to implement systems and methods provided herein.

The present disclosure provides computer systems that are programmed to implement methods of the disclosure. FIG. 10 shows a computer system 1001 that is programmed or otherwise configured to implement the system 100 of FIG. 1 and/or the process 200 of FIG. 2. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user (e.g., a database, an enterprise or extrapise system, an Internet-of-Things (IoT) device, a sensor, or the like). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, graphical representations of data to a user. Examples of UIs include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm can, for example, determine whether a segment of data looks to be an outlier compared to other segments, find trends that exist amongst segments of data, correlate different segments of data or time ranges, compare different segments of data over time, explain any trends found amongst the segments of data, perform a cohort analysis of similar segments of data, and forecast future expectations based on the data in the segments.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method, comprising:
   a) receiving a data stream comprising a plurality of records, wherein a record of said plurality of records comprises a plurality of attributes, wherein said plurality of attributes comprises at least one dimension and at least one measure;
   b) classifying each of said plurality of attributes as a dimension or a measure;
   c) generating a summary of a measure in said plurality of records;
   d) dividing said plurality of records into a plurality of time periods;
   e) generating a summary of a measure in records in a time period of said plurality of time periods;
   f) for a time period of said plurality of time periods, generating one or more segments of records, wherein each segment of said one or more segments comprises records having a combination of dimensions with unique values as compared to other segments of said one or more segments;
   g) discarding segments that contain less than a threshold quantity of records or summary value;
   h) applying an algorithm to said one or more segments to generate an output; and
   i) displaying, on a graphical user interface, a graphical representation of said output to a user.

2. The method of claim 1, wherein said dimensions are qualitative attributes.

3. The method of claim 1, wherein said measures are quantitative attributes.

4. The method of claim 1, wherein said summary comprises one or more of a sum, mean, median, and mode of said measure across said plurality of records.

5. The method of claim 1, wherein said summary comprises one or more of a sum, mean, median, and mode of said measure across said records in said time period.

6. The method of claim 1, wherein a quantity of said plurality of time periods is bounded.

7. The method of claim 1, wherein said one or more segments generated in (f) comprise every possible combination of dimensions.

8. The method of claim 1, wherein a quantity of said one or more segments is bounded.

9. The method of claim 1, wherein said one or more segments are generated after a single pass through said data stream.

10. The method of claim 1, wherein said one or more segments are generated after a second pass through said data stream.

11. The method of claim 1, wherein said output indicates whether a measure in a selected segment of said one or more segments is an outlier as compared to said measure in other segments of said one or more segments.

12. The method of claim 1, wherein said output comprises a forecast of one or more measures in at least one segment of said one or more segments for at least one time period of said plurality of time periods.

13. The method of claim 12, further comprising comparing said forecast to actual values of said one or more measures in said at least one segment of said one or more segments for said at least one time period of said plurality of time periods, and identifying one or more outlier segments for each of said one or more measures based at least in part on said comparison of said forecast to said actual values.

14. The method of claim 1, wherein said output indicates whether a first segment of said one or more segments is correlated with a second segment of said one or more segments.

15. The method of claim 1, wherein said output ranks one or more measures in each of said one or more segments based at least in part on relevance to each of said one or more segments.

16. The method of claim 1, wherein (f) is performed for each time period of said plurality of time periods.

17. The method of claim 13, wherein said output indicates whether a segment in a first time period of said plurality of time periods is correlated with a corresponding segment in a second time period of said plurality of time periods.

* * * * *